Patented Apr. 30, 1935

1,999,807

UNITED STATES PATENT OFFICE 1,999,807

EXTRACTION OF VALUES FROM ORES

Harold L. Gibbs, Salt Lake City, Utah

No Drawing. Application June 25, 1934,
Serial No. 732,385

8 Claims. (Cl. 23—18)

This invention relates to the extraction or recovery of values from ores, and particularly to the extraction or recovery of radium, uranium and vanadium from carnotite ores.

As is well known, carnotite ores contain, in addition to the mineral carnotite from which the radium, uranium and vanadium are recovered, various less valuable metals, such as iron, and one object of the invention is to provide a process by means of which the carnotite ore is so treated that a solution containing almost exclusively radium, uranium and vanadium is obtained, thus materially simplifying the subsequent steps necessary for the separate recovery of these values.

Moreover, in accordance with the invention, the use of heat and of acids in the initial steps of the process, as is now common practice, is dispensed with, and hence the cost of the process is materially reduced.

In carrying out the process of the invention the procedure is substantially as follows:—To the carnotite ore, crushed or comminuted to the desired fineness, is added substantially three times its volume of water, and to this mixture are added an alkali hydroxide, an alkali carbonate, and a per-oxygen compound, in quantities dependent upon the concentration of the carnotite in the ore. This mixture is permitted to leach, and the resulting solution, which contains almost exclusively radium, uranium and vanadium, is thereafter treated in accordance with approved practice for the separate recovery of these values.

Sodium hydroxide and sodium carbonate are a suitable alkali hydroxide and alkali carbonate, respectively, for use in the process of the invention, although others may be employed, if desired; and of the per-oxygen compounds the use of the inorganic per-oxygen compounds is preferred, such, for example, as hydrogen peroxide, sodium peroxide, potassium peroxide and sodium perborate, but particularly hydrogen peroxide.

To further define the process by means of an example derived from experimental work conducted on carnotite ore containing two percent of uranium oxide, it was found that if to one ton of such ore and the required quantity of water, sixty pounds of a thirty percent solution of hydrogen peroxide, three hundred pounds of sodium carbonate and seventy-five pounds of sodium hydroxide were added, the best results were obtained.

Although the proportions just given produced the best results, it was found that failure to use the proper quantities of the various ingredients did not defeat the object of the process but merely delayed the desired reaction.

Instead of using both an alkali hydroxide and an alkali carbonate with the per-oxygen compound, either the hydroxide or the carbonate may be omitted and satisfactory results still obtained. However, the best results are found to follow the use of all three substances in combination.

As hereinbefore stated, the process as practiced in accordance with the invention involves, preferably, the use of a per-oxygen compound, such as hydrogen peroxide, in combination with an alkali hydroxide and an alkali carbonate; these three ingredients being used in various proportions as may be found necessary to suit the percentage of carnotite present in the ore to be treated. And it will be understood that the proportions given in the foregoing example are merely illustrative and should not be taken as a limitation of the inventive concept.

However, the principal feature of the invention is the employment of a per-oxygen compound, preferably hydrogen peroxide, in the mixture containing the ore from which the values are to be recovered.

Various changes and modifications are considered to be within the spirit of the invention and the scope of the following claims.

What I claim is:—

1. In a process for recovering values from carnotite ores, the step of leaching the comminuted ore with an alkaline solution containing as an ingredient a per-oxygen compound.

2. In a process for recovering values from carnotite ores, the step of leaching the comminuted ore with a solution containing an alkali hydroxide and a per-oxygen compound.

3. In a process for recovering values from carnotite ores, the step of leaching the comminuted ore with a solution containing an alkali hydroxide, an alkali carbonate and a per-oxygen compound.

4. In a process for recovering values from carnotite ores, the step of leaching the comminuted ore with a solution containing an alkali hydroxide, an alkali carbonate and a per-oxygen compound of the group comprising hydrogen peroxide, alkali-metal peroxides and alkali-metal perborates.

5. In a process for recovering values from carnotite ores, the step of leaching the comminuted ore with a solution containing an alkali hydroxide, an alkali carbonate and hydrogen peroxide.

6. In a process for recovering values from carnotite ores, the step of leaching the comminuted ore with a solution containing sodium hydroxide, sodium carbonate and hydrogen peroxide.

7. In a process for recovering radium, uranium and vanadium from carnotite ores, the step of leaching the comminuted ore with a solution containing sodium hydroxide, sodium carbonate and a per-oxygen compound of the group comprising hydrogen peroxide, alkali-metal peroxides and alkali-metal perborates.

8. In a process for recovering radium, uranium and vanadium from carnotite ores, the step of leaching the comminuted ore with a solution containing sodium hydroxide, sodium carbonate and hydrogen peroxide.

HAROLD L. GIBBS.